Sept. 16, 1969  W. H. WULFF  3,466,938
IMPULSE DRIVE FOR SELF-PROPELLED ROTARY MOWER
Filed Oct. 27, 1967
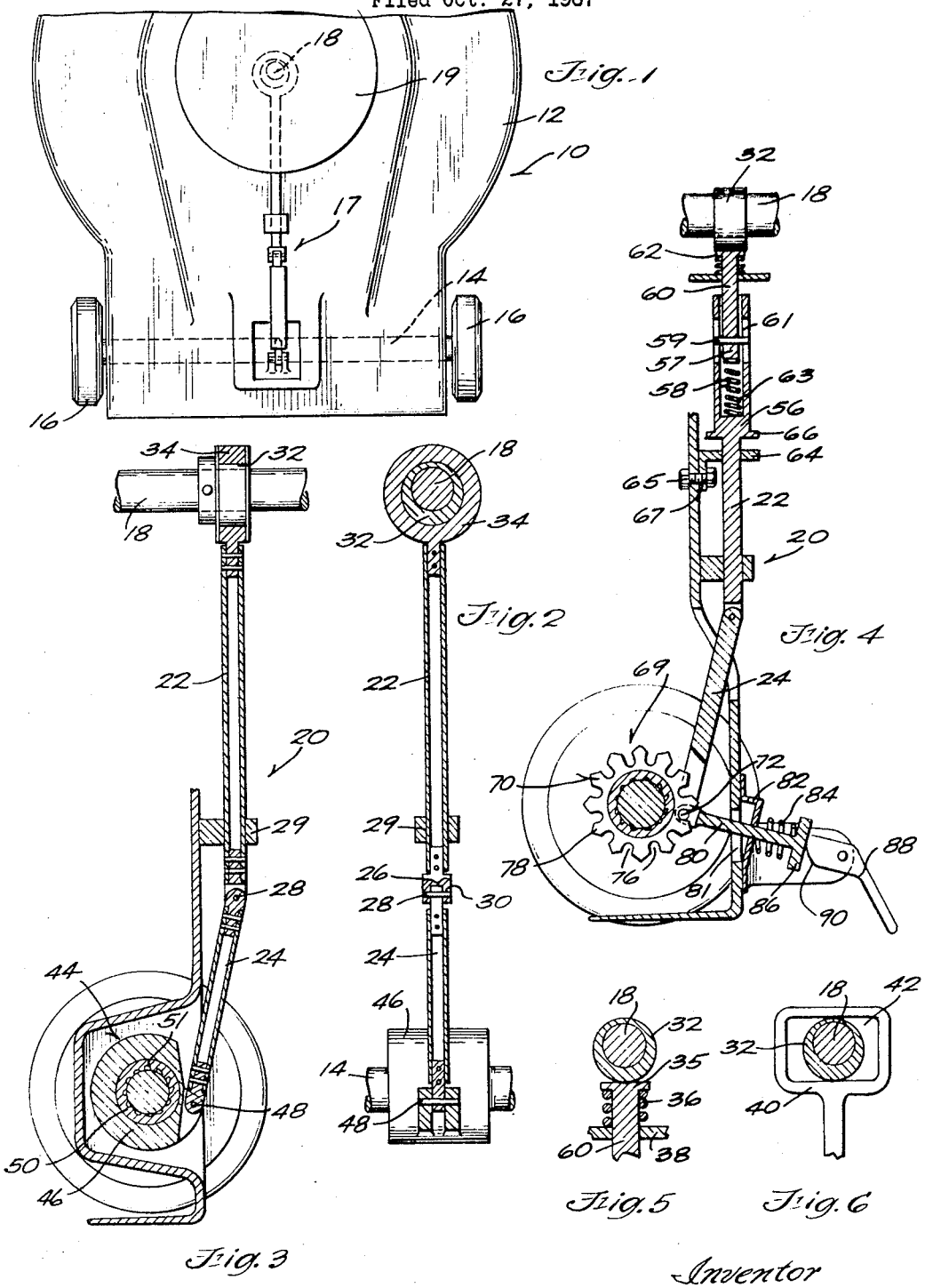
Inventor
William H. Wulff
By
Wheeler, Wheeler, House & Clemency
Attorneys

United States Patent Office

3,466,938
Patented Sept. 16, 1969

3,466,938
IMPULSE DRIVE FOR SELF-PROPELLED ROTARY MOWER
William H. Wulff, Galesburg, Ill., assignor to Outboard Marine Corporation, Waukegan, Ill., a corporation of Delaware
Filed Oct. 27, 1967, Ser. No. 678,671
Int. Cl. F16h 29/08, 29/00
U.S. Cl. 74—119
16 Claims

ABSTRACT OF THE DISCLOSURE

Disclosed herein is a rotary mower with an impulse drive connecting the output shaft of the engine to the axle to propel the mower along the ground. The drive includes, on the output shaft of the engine, an eccentric reciprocating a drive linkage which extends from the engine output shaft to the front or rear axle of the mower. The drive linkage is connected to the clutch block of a one-way clutch located on the axle. The forward speed of the mower is varied by changing the length of stroke of the drive linkage. Free wheeling of the mower is afforded by a detachable connection between the clutch block and drive linkage.

BACKGROUND OF INVENTION

The invention relates to rotary lawn mowers and more particularly to a drive train connecting the output shaft of the mower engine to an axle to propel the mower along the ground.

SUMMARY OF INVENTION

The invention contemplates the use of an impulse type drive connecting the output shaft of the engine to a mower axle to afford forward movement of a rotary mower. An eccentric secured to the output shaft of the engine rotates within a yoke connected to an articulated drive rod or linkage which is connected to the clutch block of a one-way or over-running clutch located on the mower axle. The eccentric imparts reciprocating motion to the drive linkage which, in turn, oscillates the clutch block to produce an output rotation in the mower axle in the form of a series of pulses in one direction. The clutch grips the axle as the clutch block reciprocates in one direction and releases or over-rides on the axle as the clutch block returns. The high frequency of the pulses results in an apparent smooth drive.

The invention also includes provision for varying the forward speed of the mower by changing the stroke or throw of the drive linkage.

Free wheeling of the mower is afforded by a detachable connection between the clutch block and the drive linkage. Such connection comprises a clutch block in the form of a star wheel which receives a pin carried by the drive linkage. A link and a lever connected to the drive linkage permits movement of the drive linkage to engage or disengage the pin with the star wheel.

The use of a drive in accordance with the invention permits connection of the output shaft with an axle by a drive linkage which can be located above or below the blade housing and which eliminates the need for a chain or belt drive which can be fouled by debris. The drive of the invention is particularly appropriate for transferring power to an axle which is at right angles to the engine output shaft.

Further objects and advantages of the invention will become apparent from the following description and accompanying drawings.

In the drawings:

FIGURE 1 is a plan view of a rotary lawn mower embodying a drive in accordance with the invention.

FIGURE 2 is an enlarged view of the drive shown in FIGURE 1.

FIGURE 3 is an enlarged side view of the drive shown in FIGURE 1.

FIGURE 4 is a side view of a further embodiment of a drive in accordance with the invention.

FIGURE 5 is an enlarged fragmentary view of the connection between the drive linkage and engine output shaft shown in FIGURE 4.

FIGURE 6 is an enlarged fragmentary view of a modified connection between the output shaft and the drive linkage.

DETAILED DESCRIPTION

In the drawings, FIGURE 1 shows a rotary mower which is designated generally 10 and which includes a blade housing 12 supported in part for travel in adjacent relation to the ground by an axle 14 and a pair of wheels 16 secured to the axle. The axle 14 is rotatably mounted in the blade housing 12 and can be either a front or rear axle.

The invention contemplates the use of an impulse drive designated generally 17 to transfer power from the output shaft 18 of an engine 19 to the axle 14 to propel the mower. The drive 17 includes an articulated drive rod or linkage 20 which includes a first link 22 and a second link 24 which is pivotally connected to the first link 22 by a yoke 26 (FIG. 2) at one end of link 22 and a cross pin 28 which extends through an aperture 30 in the end of the second link 24. The drive linkage is supported by a bearing 29 mounted on the blade housing 12.

The invention also includes means for connecting the drive linkage to the output shaft 18 to afford reciprocating motion of the drive linkage upon rotation of the output shaft 18. In the construction illustrated in FIGURES 1 through 3, such means are in the form of an eccentric or cam 32 which is secured to the output shaft 18 and rotates therewith. The eccentric 32 rotates freely within a collar 34 which is secured to the end of the first link 22 adjacent the engine 19. Upon rotation of eccentric 32 the drive linkage 20 is reciprocated in a direction transverse and generally perpendicular to the output shaft 18.

Alternate constructions for the means connecting the drive linkage to the output shaft are illustrated in FIGURES 5 and 6. In FIGURE 5 the means connecting the output shaft to the drive linkage includes the cam or eccentric 32 and a head 35 at the end of the first link. The head 35 is spring biased into engagement with the eccentric 32 by a spring 36 located between the head 35 and a portion of the housing 38. In FIGURE 6 the connection is in the form of a scotch yoke 40 which is located at one end of the first link 22 and which has a generally rectangular opening 42 within which the eccentric 32 rotates. The connections illustrated in FIGURES 5 and 6 eliminate the slight lateral motion of the drive linkage 20 which is present with the connecting means illustrated in FIGURE 2.

In accordance with the invention means are provided for connecting the drive linkage to the axle 14 to afford output rotation in the axle in the form of a series of pulses in one direction. In the disclosed construction such means comprises a one-way clutch or over-riding clutch 44 which includes a clutch block 46. Means are provided in the form of a pin 48 for connecting the clutch block 46 to the link 24. The clutch also includes a race 50 which contains members or rollers 51 or the like, which rollers 51 drive or grip the axle 14 when the clutch block is rotated for instance in a counterclockwise direction and which release and over-ride the axle when rotated clockwise. The use of any one-way clutch or ratchet which will afford one-way motion of the axle is within the purview of the invention. The reciprocating motion of the drive linkage 20 is of sufficiently high frequency to provide a smooth drive which appears to be continuous rotary motion of the axle 14.

Means are provided for varying the stroke or throw of the drive linkage 20 to change the forward speed of the mower. As illustrated in FIGURE 4, such means comprises a sleeve 56 which is fastened to or can be a part of one end of the first link 22 and which has a bore 58 to movably receive the free end 57 of a tappet or rod 60 which has a head 62 in engagement with eccentric 32. The tappet 60 bears against a spring 63 located with the bore 58 and is connected to the sleeve 56 by a cross pin 59 extending through the tappet 60 and into slots 61 in the sleeve. The change in the throw or length of the stroke of the drive linkage 20 is controlled by a combination bearing and stop 64 which is adjustably fixable in relation to the drive linkage by being bolted to the housing 12 by a bolt 65 extending through a slot 67 in the stop. The stop includes an aperture 67 through which the link 22 extends so that the stop is engageable against a flange 66 on the sleeve 56 to thereby arrest the travel of the sleeve 56. Accordingly, such action determines the length of the arc through which the clutch block is moved during each revolution of the eccentric 32, and thus determining the rate of rotation of the axle 14. Adjusting the position of the stop relative to the housing varies the length of travel of the sleeve and thereby varies the rotation of the shaft and rate of advancement of the mower.

In accordance with the invention, means are provided to disengage the drive linkage from the axle for free wheeling of the mower. In the disclosed construction such means comprises a clutch block 69 having circumferentially spaced teeth in the form of a star wheel 70 and a cross pin 72 in the end of the second link 24 which interfits with or is received in the gaps or notches 76 between the teeth 78 to couple the link 24 to the clutch. The means also includes means for releasably securing the pin 72 in a notch. Such means comprises an element or rod 80 which is pivotally connected to the arm 24 by the pin 72. Means are provided for mounting the rod 80 to afford rocking movement of the rod during reciprocation of the drive linkage. The last named means includes an aperture 81 in the blade housing 12, a bracket 82 and a spring 84 located between the bracket 82 and the head 86 of the rod 80. The spring 84 also biases the rod 80 to a disengaged position. The pin 72 is secured in engagement with the clutch block 69 against biasing of spring 84 by a lever 88 having a cam surface 90 which engages the head 86. The lever 88 is pivotally mounted to the blade housing to afford movement of the rod to engage or disengage the cross pin with the clutch block.

The drive of the invention can be located above or below the blade housing although in the disclosed construction it is shown above the housing. With the use of a drive in accordance with the invention, the problems encountered with belt and chain drive resulting from fouling caused by debris are eliminated.

Various of the features of the invention are set forth in the following claims.

I claim:
1. In a rotary mower including an engine with an output shaft, the engine being carried by a blade housing which is supported in part for traveling in adjacent relation to the ground by an axle having wheels secured thereto, said axle being at a right angle with respect to said output shaft, the improvement in combination therewith comprising a drive linkage, means connecting one end of said drive linkage to said output shaft to afford reciprocating motion of said drive linkage, and means connecting the other end of said drive linkage to said axle to afford a pulsating one-way rotary motion of said axle upon reciprocation of said drive linkage.

2. The improvement of claim 1 wherein said means connecting one end of said drive linkage to said output shaft to afford reciprocating motion of said drive linkage comprises an eccentric on said output shaft, a tappet at the end of said drive linkage adjacent said engine, and means biasing said tappet into engagement with said eccentric.

3. In a rotary mower including an engine with an output shaft, the engine being carried by a blade housing which is supported in part for travel in adjacent relation to the ground by an axle having wheels secured thereto, the improvement in combination therewith comprising a drive linkage, an eccentric on said output shaft, and a rectangular collar connected to said drive linkage, said collar surrounding said eccentric and in engagement therewith to afford reciprocating motion of said drive linkage, and means connecting the other end of said drive linkage to said axle.

4. An improvement in accordance with claim 1 wherein said drive linkage includes means for varying the stroke of said drive linkage to change the speed of rotation of said axle.

5. In a rotary mower including an engine with an output shaft, the engine being carried by a blade housing which is supported in part for travel in adjacent relation to the ground by an axle having wheels secured thereto, the improvement in combination therewith comprising a drive linkage, said drive linkage including a rod with a free end, a sleeve connected to said means connecting the other end of said drive linkage of said axle, said sleeve having a bore movably receiving the free end of said rod, a spring located in said bore between said rod and the end of said sleeve, and an adjustable stop fixable in relation to said drive linkage and engageable with said sleeve to vary the amount of travel of said sleeve in response to movement of said rod, and means connecting the other end of said drive linkage to said axle to afford a pulsating one-way rotary motion of said axle upon reciprocation of said drive linkage.

6. The improvement of claim 5 wherein said sleeve has opposed parallel slots and said rod has a cross pin extending through said slots.

7. The improvement of claim 1 including means for selectively engaging and disengaging said drive linkage from said axle to afford free wheeling of said mower.

8. A rotary mower including an engine with an output shaft, a blade housing, wheels supporting the blade housing for travel over the ground, a drive linkage, means connecting one end of said drive linkage to said output shaft to afford reciprocating motion of said drive linkage, a clutch block, clutch members located within said clutch block and adapted to drive said axle upon rotation of said clutch block in one direction and release said axle when said clutch block is rotated in the other direction, a notch in the periphery of said clutch block, a cross pin at the end of the drive linkage adjacent the axle, said cross pin being engageable with said notch, and means for releasably securing said cross pin in said notch.

9. A rotary mower in accordance with claim 8 wherein said means for releasably securing said cross pin in said notch comprises an element connected to said drive linkage, means mounting said element on said blade housing to afford rocking movement of said element upon reciprocation of said drive linkage, and a manually operable lever pivotally mounted on said blade housing for movement into engagement with said element to engage said cross pin in said notch.

10. A rotary mower in accordance with claim 8 wherein said clutch block has a plurality of circumferentially arranged notches.

11. A drive connecting a first shaft and a second shaft including a sleeve having a bore, a rod telescopically received in said bore, means connecting said rod to said first shaft to afford reciprocating motion of said rod, means connecting said sleeve to said second shaft to afford one-way pulsating rotary motion of said second shaft, a spring located in said bore between the end of said rod and the bottom of said bore, and an adjustable stop fixable in relation to one of said shafts and engageable with said sleeve to vary the amount of travel of said sleeve in response to movement of said rod.

12. A drive for connecting a first shaft to a second shaft to afford a pulsating one-way rotary motion of said second shaft comprising a drive linkage, means connecting one end of said drive linkage to said first shaft to afford reciprocating motion of said drive linkage, a one-way clutch on said second shaft, said clutch having a plurality of circumferentially spaced notches in the periphery of said clutch, and means cooperating with said notches for detachably connecting said drive linkage to said clutch block.

13. A drive in accordance with claim 12 wherein said second shaft is at right angles to said first shaft.

14. The drive of claim 12 wherein said means for detachably connecting said drive linkage to said clutch block comprises a pin in said drive linkage adapted to interfit with said notches in said clutch block, a push rod connected to said drive linkage, and means engageable with said push rod to detachably secure said pin in engagement with said notches in said clutch block.

15. The drive of claim 14 wherein said push rod is biased to disengage said pin.

16. A rotary mower including a blade housing, an engine with an output shaft carried by said blade housing, said blade housing being supported in part for travel in adjacent relation to the ground by an axle having wheels secured thereto, a drive linkage, means connecting one end of said drive linkage to said output shaft to afford reciprocating motion of said drive linkage, and means connecting the other end of said drive linkage to said axle to afford a pulsating one-way rotary motion of said axle upon reciprocation of said drive linkage.

References Cited

UNITED STATES PATENTS

| | | | |
|---|---|---|---|
| 1,134,973 | 4/1915 | Stanley | 74—581 |
| 2,359,815 | 10/1944 | Wilcox | 74—586 |
| 2,384,110 | 9/1945 | Malmquist | 74—116 |

FRED C. MATTERN, JR., Primary Examiner

W. S. RATLIFF, JR., Assistant Examiner

U.S. Cl. X.R.

74—116, 581